United States Patent Office 3,835,072
Patented Sept. 10, 1974

3,835,072
PHENOLIC RESIN ION EXCHANGE FIBERS
James Economy, Eggertsville, and Luis C. Wohrer, Lewiston, N.Y., assignors to The Carborundum Company, Niagara Falls, N.Y.
No Drawing. Filed Oct. 2, 1972, Ser. No. 293,876
Int. Cl. C08g 5/18
U.S. Cl. 260—2.1 C       10 Claims

ABSTRACT OF THE DISCLOSURE

An ion exchange fiber comprising a cured infusible phenolic resin having primary, secondary, tertiary or quaternary amine groups.

BACKGROUND OF THE INVENTION

The present invention relates to the preparation of ion exchange fibers from phenolic resin fibers.

Conventional ion exchange resins have a "backbone," the principal unit to which the ion exchange groups are bound, of convention gel-type styrene-based matrix prepared by copolymerization of styrene and divinylbenzene at various ratios. Such resins have excellent ion exchange capacity. However, the shape of the final product is generally limited to small solid particles which are used to form a bed of the ion exchange medium.

Fibrous ion exchange materials have several advantages over the conventional ion exchange units. These advantages include the ability to be fabricated in the form of felts or fabrics in which the porosity can be carefully controlled.

Phenolic resins are produced by the condensation of a phenol and an aldehyde. The phenol employed is most commonly phenol itself, but any of a wide variety of phenols as well as mixtures thereof may be used, such as phenol which is substituted in the ortho, meta and/or para position, provided that sufficient ortho and para positions are unsubstituted to permit condensation and cross linking. Similarly, various aldehydes have been employed, formaldehyde being by far the most commonly used. Accordingly, many different varieties of phenolic resins are commercially available.

Phenolic resins are generally classified as either resoles or novolacs. Resoles are ordinarily prepared by carrying out the condensation with a molar excess of the aldehyde and in the presence of an alkaline catalyst. Resoles are characterized by the presence therein of methylol groups, which render it possible to effect curing and cross linking via methylene linkages by heat alone. Novolacs are usually prepared by employing an acid catalyst and a slight molar excess of the phenol. Novolacs are characterized by the absence of methylol groups, and accordingly, they cannot be cured and cross linked by heat alone, additionally requiring the presence of a source of methylene groups and preferably a suitable catalyst. A particularly desirable method for the preparation of infusible cured novolac fibers is described in U.S. Pat. No. 3,650,102.

Heretofore, a fibrous ion exchange material having superior mechanical properties and dimensional stability has not been prepared.

SUMMARY OF THE INVENTION

According to the present invention, there is provided an ion exchange fiber comprising a cured phenolic resin having ion exchange groups selected from the group consisting of primary, secondary, tertiary and quaternary amine groups.

The fibrous ion exchange fibers of the present invention have several advantages over conventional ion exchange units which include excellent ion exchange capacity as well as heat insulation, flame retardancy, chemical resistance, and excellent mechanical properties of strength, elongation and elasticity.

DETAILED DESCRIPTION

Infusible cured phenolic resin fibers which serve as a backbone or base for the ion exchange groups can be prepared according to a preferred process described in U.S. Pat. No. 3,650,102, the details of which are incorporated herein by reference to give an infusible cured novolac. A resole fiber can be prepared conventionally by condensing phenol with a two-fold molar excess of formaldehyde in the presence of a catalytic amount of sodium hydroxide. Water produced during the condensation reaction can be conveniently removed by vacuum distillation and subsequent freeze drying to produce a resin having a molecular weight of from about 200 to 2000. The resin is fiberized by melt spinning, filaments being drawn through orifices from a melt at about 80° C. and collected on a spindle. The orifices are such that the resulting white, fusible, uncured resole fibers have diameters ranging from about 15 microns to about 25 microns. The phenolic resole resin is cured by heating the fibers gradually from room temperature to 150° C., over a period of about 30 to 60 hours. Longer curing times can be utilized but do not substantially enhance the properties of the final infusible, cured, cross-linked fibers which are rather dark reddish-pink. The fibers produced in this manner have a tenacity ranging from about 1.0 g./den. to about 2.0 g./den. and a break elongation ranging from about 1 percent to about 10 percent. The cured phenolic fibers are characterized by a repeating phenolic unit.

The substitution of the amine groups is conveniently made by treating the cured infusible phenolic resin with an excess of a haloalkylating agent to introduce a haloalkyl group into the fibers. Haloalkylation is followed by amination with a suitable amine to introduce an amino or mono-, di or tri-substituted amine group into the fibers.

The haloalkylating agent is preferably a haloaliphatic symmetrical or unsymmetrical ether such as a haloalkyl ether of less than about 20 carbon atoms. Illustrate of such ethers are chloromethyl ether, bromoethyl ether, chloromethyl methyl ether, chloroethyl isopropyl ether, chlorobutyl ethyl ether, chloropropyl ether, and α-chloropentyl methyl ether.

The haloalkylating agent is reacted with the infusible cured phenolic fibers at a suitable temperature and for a sufficient period of time with an excess of the haloalkylating agent together with a catalytic amount of a suitable catalyst such as zinc chloride, aluminum chloride or stannic chloride.

The haloalkylated infusible phenolic fibers preferably contain haloalkyl groups of less than about 12 carbon atoms. The hydroxy groups of the phenolic fibers react to give a haloalkyl substituent on the phenyl groups of the infusible phenolic resin.

Amination is performed by reacting the haloalkylated infusible phenolic fibers with ammonia, mono-, di- or tri-substituted amine at a suitable temperature for a sufficient period of time to give phenolic fibers having a corresponding primary, secondary, tertiary or quaternary amine for ion exchange. Preferably the amination agent is an alkyl amine of less than about 12 carbon atoms. Illustrative of amines are methyl amine, ethyl amine, pentyl amine, dimethyl amine, methyl ethyl amine, triethyl amine, diethyl methyl amine and dibutyl ethyl amine. Other amines such as ethylene diamine and diethylene triamine can also be used. Generally, the amination can be performed by reacting the amine and the infusible fiber in an aqueous solution of the amine at temperatures from room temperature to about 100° C.

Preferably sufficient amine groups are introduced into the fibers to give an ion exchange capacity greater than about 1 meq./g. and preferably greater than about 1.5 meq./g.

Preferably the final ion exchange fibers have at least about 0.1 substituted amine ion exchange groups per phenolic unit and more preferably at least about 0.3 substituted groups per phenolic unit. The fiber diameter is preferably less than about 30 microns and more preferably less than about 20 microns. Preferably the resulting fibers have an anion capacity greater than about 1.0 meq./g. and more preferably greater than about 1.5 meq./g. The tensile strength of average fibers is preferably greater than about 5000 p.s.i. (350 kg./sq. cm.) and more preferably greater than 8000 p.s.i. (560 kg./sq. cm). The average modulus of elasticity is preferably greater than $0.20 \times 10^6$ p.s.i. ($0.014 \times 10^6$ kg./sq. cm.) and more preferably greater than $0.30 \times 10^6$ p.s.i. ($0.021 \times 10^6$ kg./sq. cm.).

The infusible phenolic fibers can be treated with a swelling or softening agent prior to haloalkylation or after haloalkylation and prior to amination. Suitable organic liquids to effect softening and/or swelling of the infusible cured phenolic resin fibers include various non-reactive organic solvents such as benzene or o-dichlorobenzene.

The ion exchange fibers of the present invention contain the polar amino ($-NH_3X$), aliphatic amine ($-NH_2RX$), aliphatic amine ($-NH_2X$) or trialiphatic amine ($-NR_3X$) wherein R is an aliphatic radical of less than about 12 carbon atoms and more preferably less than about 5 carbon atoms. R is preferably an alkyl group. The exchangeable anion X can be any anion such as $F^-$, $Cl^-$, $OH^-$, $H_2PO_4^-$, $HCO_3^-$, $NO_2^-$, $HSO_3^-$, $CN^-$, $Br^-$, $NO_3^-$, $HSO_4^-$, or $I^-$.

Various conventional textile techniques may be employed to process the infusible cured phenolic fibers into a variety of useful forms. The infusible cured phenolic fibers can be processed into a textile form either prior to or after reacting to form the ion exchange fiber. The fibers, when prepared by drawing, are initially in continuous form, but short staple fibers can also be produced by a conventional blowing method. Considering the staple form, this may be chopped into short lengths and made into paper by conventional means. Alternatively, the staple fiber may be corded to produce a fluffy web, which may be processed by needling to obtain a needled felt. The fluffy web can also be divided into strips which are slightly twisted to form a roving from which yarn may be formed which in turn may be woven into cloth.

In the examples, the cation capacity was determined in a conventional manner. A known air dried amount of ion exchange fibers was exhausted by contacting with a known amount of an aqueous solution containing an anion that exchanges with the anion of the ion exchange group. An acid-base titration of the effluent solution gives a capacity in meq./g.

The invention will be further described partly with reference to the following examples, which are intended to illustrate, and not limit, the scope of the invention.

Example 1

A novolac is prepared conventionally by condensing formaldehyde with a slight molar excess of phenol in the presence of a catalytic amount of oxalic acid. After purification to remove any particulate impurities in residual phenol, the resin had an average molecular weight of about 720 and a viscosity at 150° C. of about 41,300 cps. The resin was fiberized by melt spinning, a plurality of filaments being simultaneously drawn from a melt at 135° C. through a bushing having about 1000 orifices of 1.8 mm. inner diameter, at the rate of 760 m./min. The fibers which were wound upon a spool were white, fusible and had an average diameter of 12 microns. The fibers were immersed in an aqueous solution containing 18 percent paraformaldehyde as a source of methylene groups and 18 percent HCl as a catalyst, at room temperature (about 25° C.). The solutiont was heated to 30° C. over a period of 1 hour, then to 40° C. over a period of 1 hour, then to 70° C. over a period of 1 hour, then to the boiling point (103° C.) over a period of 30 minutes, and the temperature was held at the boiling point for 1 hour, whereupon the fibers were removed, washed with water and dried in air at about 60° C. The resulting infusible cured novolac fibers were rather deep reddish-pink. They had an average tenacity of about 1.7 g./den. and a break elongation ranging from about 5 percent to about 40 percent and averaging about 25 percent. About 50 g. of chloromethyl ether was added to a vessel containing about 10 g. of fibers and about 6 g. of zinc chlorine of about 50° C. The resulting reacted mixture was placed in cold water to react the excess chloromethyl ether and zinc chloride. The resulting fibers were washed. About 25 g. of a 30 percent aqueous solution of trimethyl amine was added to the fibers. The mixture was maintained at about 50° C. for about 5 hours while stirring. The resulting fibers were washed. The ion exchange capacity of the product was about 0.8 meq./g.

Example 2

Three separate portions of chloromethylated product prepared according to the procedure of Example 1 were reacted respectively with excess amounts of ammonia, methyl amine, dimethyl amine to give a resulting product displaying ion exchange activity.

Example 3

A resole was prepared conventionally by condensing phenol with a two-fold molar excess of formaldehyde in the presence of a catalytic amount of sodium hydroxide. After removing the water by vacuum distillation and subsequently by freeze drying, the resin had an average molecular weight of about 500. The resin was fiberized by melt spinning, filaments being drawn through orifices from a melt at 80° C. and collected on a spool. The white, fusible, uncured resole fibers had diameters ranging from 15 microns to 25 microns. The fibers were cured by heating the fibers gradually from room temperature to 150° C. over a period of 50 hours. The resulting infusible, cured, cross-linked resole fibers were rather dark reddish-pink. They had a tenacity ranging from about 1 g./den. to about 2 g./den. and a break elongation ranging from about 1 percent to about 10 percent. In a manner similar to Example 1, a portion of the resulting fibers were chloromethylated and aminated to give a resulting fiber that exhibited ion exchange activity similar to that of Example 1.

What is claimed is:

1. An ion exchange fiber consisting essentially of a cured infusible phenolic resin having appended thereto ion exchange groups selected from the group consisting of primary, secondary, tertiary or quaternary amine groups.

2. An ion exchange fiber according to claim 1 wherein the primary amine group is of the formula $-NH_3RX$, wherein X is an exchangeable anion and R is alkyl of less than about 12 carbon atoms.

3. An ion exchange fiber according to claim 1 wherein said secondary amine group is of the formula $-NH_2R_2X$, wherein X is an exchangeable anion and R is alkyl of less than about 12 carbon atoms.

4. An ion exchange fiber according to claim 1 wherein said tertiary amine group is of the formula $-NHR_3X$, wherein X is an exchangeable anion and R is alkyl of less than about 12 carbon atoms.

5. An ion exchange fiber according to claim 1 wherein said quaternary amine group is of the formula —$NR_4X$, wherein X is an exchangeable anion and R is alkyl of less than about 12 carbon atoms.

6. An ion exchange fiber according to claim 1 wherein said fiber has a tensile strength greater than about 5000 p.s.i.

7. An ion exchange fiber according to claim 1 having a modulus of elasticity greater than about $0.20 \times 10^6$ p.s.i.

8. An ion exchange fiber according to claim 1 comprising an infusible cured novolac.

9. An ion exchange fiber according to claim 1 wherein said resin includes at least about 0.1 ion exchange group per phenolic unit.

10. An ion exchange fiber according to claim 1 having a capacity greater than about 0.1 meq./g.

References Cited

UNITED STATES PATENTS

| | | | |
|---|---|---|---|
| 2,521,288 | 9/1950 | Evers | 260—45 |
| 2,531,863 | 11/1950 | Scott et al. | 260—43 |
| 2,601,202 | 6/1952 | Bauman et al. | 260—57 |
| 2,859,186 | 11/1958 | Boresch et al. | 260—2.1 |
| 3,650,102 | 3/1972 | Economy et al. | 57—140 |
| 2,582,098 | 1/1952 | Braithwaite et al. | 210—24 |

FOREIGN PATENTS 13,668  1960  Japan.

OTHER REFERENCES

Pao: Hua Hsueh Shih Cieh 14, 271–72 (1959).

Egawa: Kogyo Kagaku Zasshi 68, 13-7-11 (1965).

MELVIN GOLDSTEIN, Primary Examiner